United States Patent
Park et al.

(10) Patent No.: US 10,187,245 B2
(45) Date of Patent: Jan. 22, 2019

(54) METHOD AND APPARATUS FOR EXCHANGING SIP OPTION MESSAGE FOR CAPABILITY DISCOVERY OF RICH COMMUNICATION SUITE IN PORTABLE TERMINAL

(71) Applicant: Samsung Electronics Co. Ltd., Suwon-si, Gyeonggi-do (KR)

(72) Inventors: Jun-Hyo Park, Gumi-si (KR); Jeong-Wook Seo, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1131 days.

(21) Appl. No.: 13/871,707

(22) Filed: Apr. 26, 2013

(65) Prior Publication Data

US 2013/0297811 A1 Nov. 7, 2013

(30) Foreign Application Priority Data

May 3, 2012 (KR) .................. 10-2012-0047080

(51) Int. Cl.
*H04W 4/20* (2018.01)
*H04W 4/50* (2018.01)
*H04L 29/06* (2006.01)

(52) U.S. Cl.
CPC ......... *H04L 29/06197* (2013.01); *H04W 4/20* (2013.01); *H04W 4/50* (2018.02)

(58) Field of Classification Search
CPC .......................... G06F 9/4401; G06F 1/3212
(Continued)

(56) References Cited

U.S. PATENT DOCUMENTS

| 6,577,229 | B1 * | 6/2003 | Bonneau | G06K 7/0008 235/379 |
| 2009/0187733 | A1 | 7/2009 | El-Ghazawi | |
| 2009/0262667 | A1 * | 10/2009 | Kobayashi | H04L 12/4625 370/254 |
| 2011/0154007 | A1 * | 6/2011 | Juvonen | G06F 1/3212 713/2 |

(Continued)

FOREIGN PATENT DOCUMENTS

| CN | 101155185 A | 4/2008 |
| KR | 10-2005-0009662 A | 1/2005 |
| KR | 10-2010-0074536 A | 7/2010 |

OTHER PUBLICATIONS

RCS-e—Advanced Communications: Services and Client Specification, Version 1.2—preview, Aug. 5, 2011, RCE GEN 001.*

(Continued)

*Primary Examiner* — Vivek Srivastava
*Assistant Examiner* — Hermon Asres
(74) *Attorney, Agent, or Firm* — Jefferson IP Law, LLP (57) ABSTRACT

A method of exchanging Session Initiation Protocol (SIP) options messages for Rich Communication Suite (RCS) capability discovery in a portable terminal is provided. The method includes requesting a server for a setting value associated with an SIP options message exchange, receiving the setting value including the number of the SIP options messages for transmission and a transmission cycle of the SIP options message, transmitting the SIP options message to each of as many contacts as the number of the SIP options messages in the transmission cycle, receiving a reply message from each of the contacts to which the SIP options message is sent, and updating RCS capability information of the contact according to the received reply message, the contacts are registered to a phone book of the portable terminal.

15 Claims, 7 Drawing Sheets

| RCS-e service | Tag INFORMATION | |
|---|---|---|
| 40a~ IM/Chat | +g.3gpp.iari-ref="urn%3Aurn-7%3agpp-application.ims.iari.rcse.im" | ~40b |
| 50a~ File transfer | +g.3gpp.iari-ref="urn%3Aurn-7%3agpp-application.ims.iari.rcse.ft" | ~50b |
| 60a~ Image share | +g.3gpp.iari-ref="urn%3Aurn-7%3agpp-application.ims.iari.gsma-is" | ~60b |
| 70a~ Video share | +g.3gpp.cs-voice | ~70b |

(58) Field of Classification Search
USPC .......................................................... 709/228
See application file for complete search history.

(56) References Cited

U.S. PATENT DOCUMENTS

2011/0258293 A1    10/2011  Kim
2012/0225652 A1*    9/2012  Martinez ........... H04M 3/42374
                                            455/435.1
2013/0054740 A1*    2/2013  Klein .................. H04L 65/1069
                                            709/217
2013/0235776 A1*    9/2013  Park .................. H04W 52/0229
                                            370/311

OTHER PUBLICATIONS

RCS-e—Advanced Communciations: Services and Client Specification, Version 1.2—preview, Aug. 5, 2011, RCE GEN 001.*
Rich Communciation Suite 5.0 Advanced Communications Services and Client Specification, Version 1.0, Apr. 19, 2012.*
RCE-e—Advanced Communicaitons: Services and Client Specification, Version 1.2—preview, Aug. 5, 2011, RCE GEN 001.*
Rich Communication Suite 5.0 Advanced Communications Services and Client Specification, Version 1.0 Apr. 19, 2012.*
RCE-e—Advanced Communication: Services and Client Specification, Version 1.2 Preview, Aug. 5, 2011, RCE GEN 001 (Year: 2011).*
Rich Communication Suite 5.0 Advanced Communications Services and Client Specification, Version 1.0 Apr. 19, 2012 (Year: 2012).*
"RCS-e—Advanced Communications: Services and Client Specification Version1.2—preview Aug. 5, 2011 RCE GEN 001"; RCE GEN 001 RCS-e—Advanced Comms: Services and client specification; Draft Version 1.2—preview; Aug. 5, 2011; XP064082448.
"Rich Communication Suite 5.0 Advanced Communications Services and Client Specification" Version 1.0; RCS 5.0: Services and Client Specification; Apr. 19, 2012; XP055077342.

* cited by examiner

FIG.1A

| RCS-e service | Tag INFORMATION | |
|---|---|---|
| IM/Chat | +g.3gpp.iari-ref="urn%3Aurn-7%3agpp-application.ims.iari.rcse.im" | 40b |
| File transfer | +g.3gpp.iari-ref="urn%3Aurn-7%3agpp-application.ims.iari.rcse.ft" | 50b |
| Image share | +g.3gpp.iari-ref="urn%3Aurn-7%3agpp-application.ims.iari.gsma-is" | 60b |
| Video share | +g.3gpp.cs-voice | 70b |

| SETTING VALUE 1 | M: 1 | N: 21 SEC |
| SETTING VALUE 2 | M: 2 | N: 18 SEC |
| SETTING VALUE 3 | M: 3 | N: 15 SEC |
| SETTING VALUE 4 | M: 4 | N: 12 SEC |
| SETTING VALUE 5 | M: 5 | N: 9 SEC |

METHOD AND APPARATUS FOR EXCHANGING SIP OPTION MESSAGE FOR CAPABILITY DISCOVERY OF RICH COMMUNICATION SUITE IN PORTABLE TERMINAL

PRIORITY

This application claims the benefit under 35 U.S.C. § 119(a) of a Korean patent application filed on May 3, 2012 in the Korean Intellectual Property Office and assigned Serial No. 10-2012-0047080, the entire disclosure of which is hereby incorporated by reference.

BACKGROUND OF THE INVENTION

1. Field of the Invention

The present invention relates to portable terminals. More particularly, the present invention relates to capability discovery performed to use Rich Communication Suite (RCS) services with contacts stored in a phone book.

2. Description of the Related Art

Rich Communication Suite (RCS) or Rich Communication Suite-enhanced (RCS-e) provides various communication capabilities for users of portable terminals based on standard specifications proposed by the Global System for Mobile Communications Association (GSMA).

Starting in Europe, the RCS or RCS-e will be expanded all over the world including Korea and the Americas. Communication capabilities provided by the RCS or RCS-e include enriched calls that enable multimedia content sharing during a voice call, enhanced phone books that enable information about the other party (or a contact) registered to the phone book to be obtained in real time, enriched messaging that enables file sharing during texting, and the like.

To use the RCS (or RCS-e) services that provide such capabilities, a procedure is required to determine whether the other party's portable terminal supports the RCS service.

The user's portable terminal performs the procedure in order to determine whether respective mobile devices of contacts registered to the phone book support the RCS or RCS-e service. The procedure is called capability discovery.

Considering that the capability discovery is performed for each contact registered to the phone book over a network, it takes long time to complete the capability discovery for all contacts if a large number of contacts are registered to the phone book. This, in turn, leads to increased battery consumption of the portable terminal. Therefore, a need exists for a capability discovery that is designed to takes into account several requirements that have to be completed in as short a time as possible, that is designed to prevent excessive data traffic for the network from being caused, and that is designed to minimize power consumption of the portable terminal.

With the requirements addressed, capability discovery of the RCS or RCS-e may have various advantages.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a capability discovery method (or method for exchanging Session Initiation Protocol (SIP) options messages) that prevents excessive generation of data traffic in a network and minimizes the battery consumption of a portable terminal while the portable terminal using Rich Communication Suite (RCS) or Rich Communication Suite-enhanced (RCS-e) performs the capability discovery.

In accordance with an aspect of the present invention, a method of exchanging SIP options messages for RCS capability discovery in a portable terminal is provided. The method includes requesting a server for a setting value associated with an SIP options message exchange, receiving the setting value including the number of the SIP options messages for transmission and a transmission cycle of the SIP options message, transmitting the SIP options message to each of as many contacts as the number of the SIP options messages in the transmission cycle, receiving a reply message from each of the contacts to which the SIP options message is sent, and updating RCS capability information of the contact according to the received reply message, wherein the contacts are registered to a phone book of the portable terminal.

In accordance with another aspect of the present invention, an apparatus for exchanging SIP options messages for RCS capability discovery in a portable terminal is provided. The apparatus includes a wireless transceiver, a memory, and a controller configured to request a server for a setting value associated with an SIP options message exchange, to receive the setting value including the number of the SIP options messages for transmission and a transmission cycle of the SIP options message, to transmit the SIP options message to each of as many contacts as the number of the SIP options messages in the transmission cycle and to receive a reply message from each of the contacts to which the SIP options message is sent, the contacts being registered to a phone book of the portable terminal, and to update RCS capability information of each contact according to the received reply message.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The capability discovery process of Rich Communication Suite (RCS) or RCS-enhanced (RCS-e) is handled or performed using Session Initiation Protocol (SIP) options message exchanges.

Figure 1A:
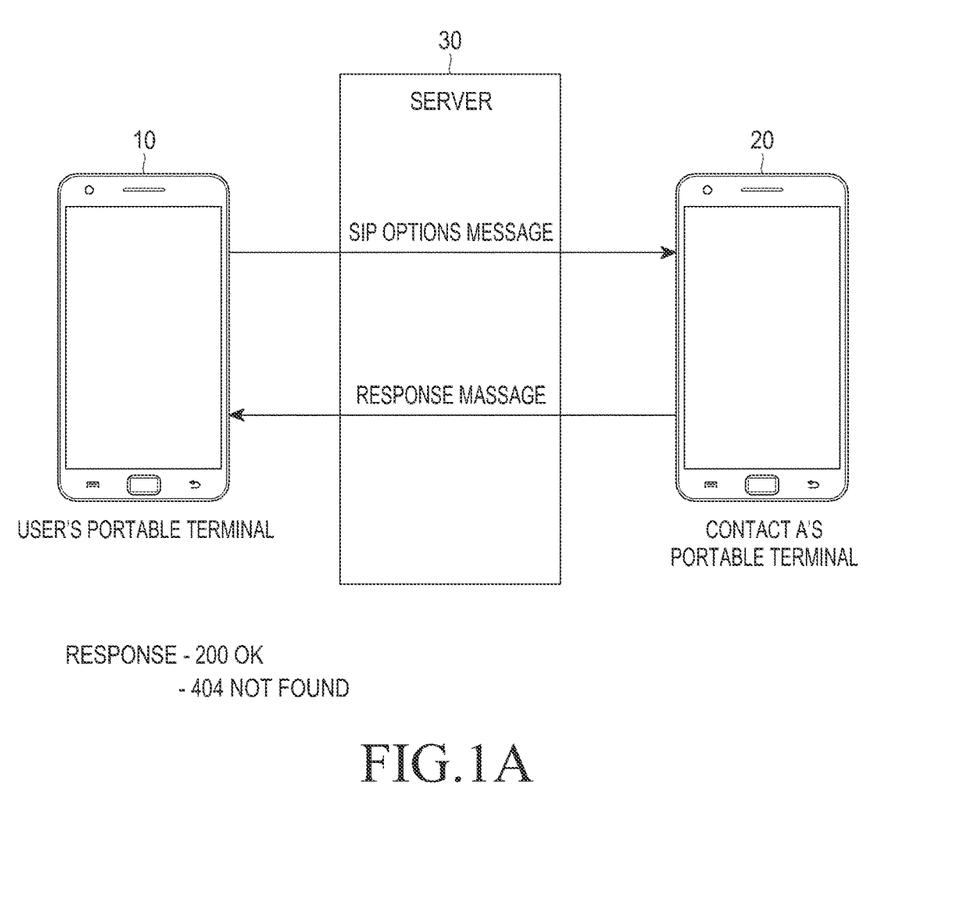
FIG. 1A is a schematic block diagram illustrating a Session Initiation Protocol (SIP) options message exchange according to an exemplary embodiment of the present invention.
Figure 1B:
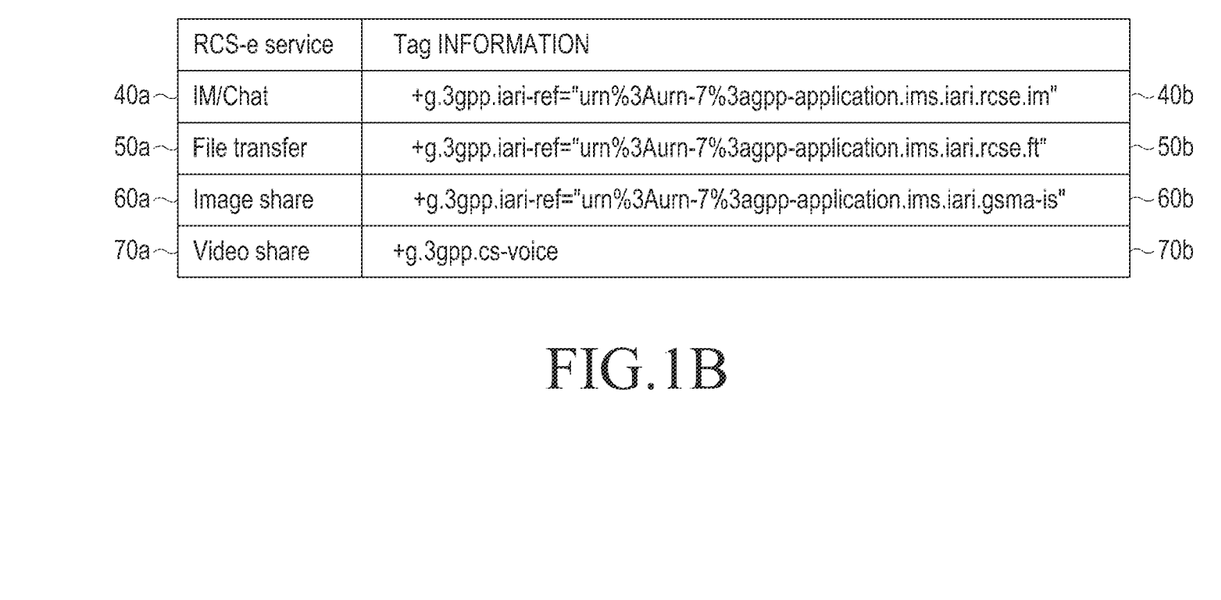
FIG. 1B illustrates tag information included in a response message to a SIP options message according to an exemplary embodiment of the present invention.

FIG. 1A is a schematic block diagram illustrating a SIP options message exchange according to an exemplary embodiment of the present invention. FIG. 1B illustrates an example of tag information included in a response message to the SIP options message according to an exemplary embodiment of the present invention.

Referring to FIG. 1A, to check if contact A's portable terminal 20 is capable of RCS communication, i.e., to perform capability discovery, a user's portable terminal 10 transmits a SIP options message to a portable terminal 20 of contact A registered to a phone book of the user's portable terminal 10 through a server 30, and the contact A's portable terminal 20 transmits a response message to the user's portable terminal 10 through the server 30. The server 30 refers to, for example, a server of a telecom service operator (e.g., KT or SKT in Korea) and may be assumed to provide a communication service and the RCS service.

In exemplary embodiments, there are many different types of the response message, including 200 OK and 404 NOT FOUND, among others.

A 404 NOT FOUND reply message may indicate that the RCS service is not available to the user's portable terminal 10 and the contact A's portable terminal 20. Similar response messages may include 480 TEMPORARILY UNAVAILABLE and 408 REQUEST TIMEOUT.

On the contrary, a 200 OK reply message may indicate that the RCS service is available to the user's portable terminal 10 and the contact A's portable terminal 20. Tag information about a type of the available RCS service may be included in the reply message 200 OK.

Referring to FIG. 1B, the 200 OK reply message may include tag information as shown, based on which the user's portable terminal 10 may determine what type of the RCS service is available to the user's portable terminal 10 and the contact A's portable terminal 20.

For example, when the 200 OK reply message includes tag information 40b of FIG. 1B, the user's portable terminal 10 may use an RCS service (instant messaging IM/CHAT) 40a with the contact A's portable terminal 20. In another example, when the 200 OK reply message includes tag information 50b and 60b, the user's portable terminal 10 may know that RCS services 50a and 60a (file transfer and image share) are available to the user's portable terminal 10 and the contact A's portable terminal 20. Likewise, when the 200 OK reply message includes tag information 70b, the user's portable terminal 10 may know that RCS services 70a (video share) are available to the user's portable terminal 10 and the contact A's portable terminal 20.

By way of background, as for the SIP options message exchange as described in FIGS. 1A and 1B, Global System for Mobile Communications Association (GSMA) has not yet standardized how to exchange SIP options messages (refer to the document of res-e_advanced_comms_specification-v1.2.1). Instead, GSMA has proposed that telecom operators or portable terminal manufacturers establish, at their discretion, the method of exchanging SIP options messages, especially the number of SIP options messages and a transmission cycle.

An exemplary embodiment of the SIP options message exchange will be described with reference to FIG. 2.

Figure 2:
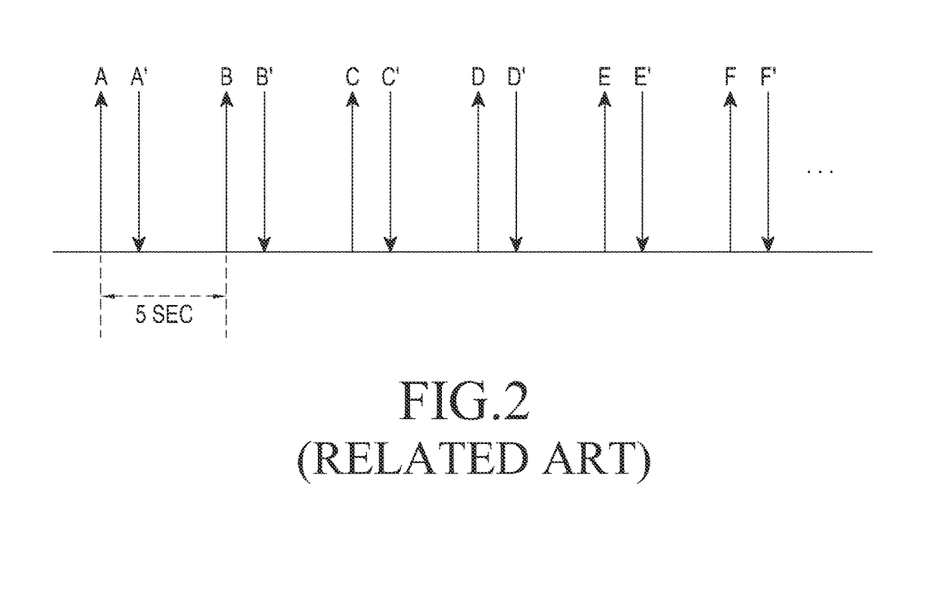
FIG. 2 illustrates a diagram of SIP options message exchanges according to the related art.

FIG. 2 illustrates a diagram of SIP options message exchanges according to the related art. In FIG. 2, a user's portable terminal is assumed to perform the capability discovery process with many portable terminals A, B, C, D, and F.

Referring to FIG. 2, the user's portable terminal performs the capability discovery process with the portable terminal A by transmitting a SIP options message A and receiving a reply message A'. With the lapse of a predetermined capability discovery cycle (e.g., 5 seconds), the user's portable terminal starts the capability discovery process with the portable terminal B by transmitting a SIP options message B and receiving a reply message B'. In this way, the user's portable terminal performs such capability discovery for the rest of portable terminals C, D, E, and F in predetermined cycles (e.g., 5 seconds) by exchanging SIP options messages with them.

As shown in FIG. 2, while performing the capability discovery for each of the portable terminals A to F by exchanging the SIP options message with the portable terminal, the user's portable terminal cannot enter sleep mode, which means that the battery of the portable terminal may be consumed quickly.

For example, if 1,000 contacts are registered to the phone book of the user's portable terminal, the user's portable terminal exchanges the SIP options message with all of the 1000 contacts, i.e., performs the capability discovery for the 1,000 contacts' portable terminals, and while the user's portable terminal is exchanging the SIP options message 1,000 times, its battery may be consumed very quickly.

Such SIP options message exchanges may cause excessive data traffic at a specific time in a telecom operator's network.

Therefore, a need exists for preventing excessive data traffic from being caused in a specific time such that loads of the telecom operator's server are evenly distributed and for minimizing battery consumption of the portable terminal to ensure longer usage time in relation to the SIP options message exchanges.

Figure 3A:
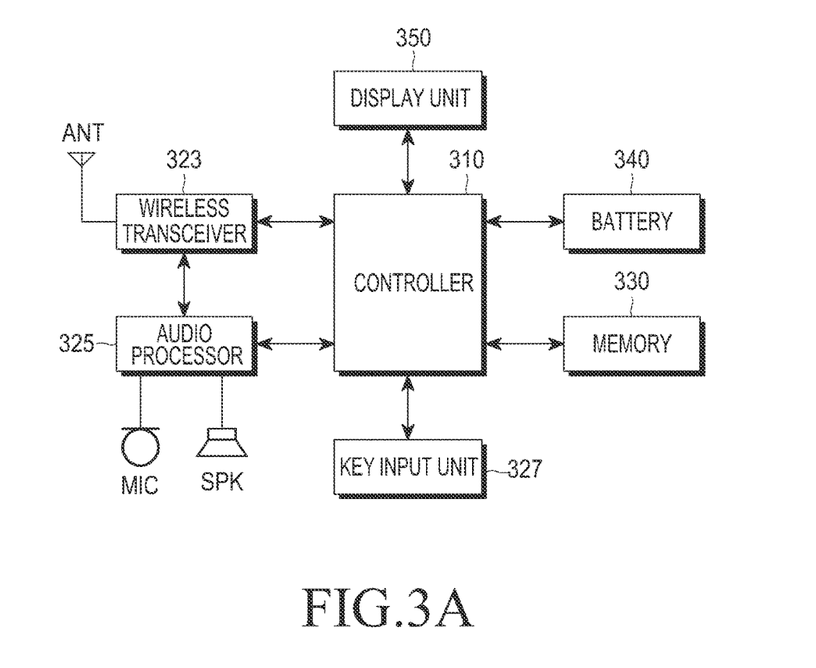
FIG. 3A is a block diagram of a portable terminal according to an exemplary embodiment of the present invention.

FIG. 3A is a block diagram of a portable terminal according to an exemplary embodiment of the present invention.

Referring to FIG. 3A, the portable terminal may be an easy-to-carry electronic device, such as a feature phone, a smartphone, a Windows or Mac-based notebook, or the like. Here, the smartphone may use a mobile operating system, such as Windows 8®, iOS®, Android, Bada®, or the like.

A wireless transceiver 323 includes a Radio Frequency (RF) unit and a modem. The RF unit includes an RF transmitter for up converting the frequency of a signal for transmission and amplifying the signal, and an RF receiver for low-noise amplifying a received signal and down converting the frequency of the received signal. The modem includes a transmitter for encoding and modulating the signal to be transmitted and a receiver for demodulating and decoding the signal received from the RF unit.

The controller 310 performs the capability discovery for a contact registered to a phone book by controlling the wireless transceiver 323 to transmit the SIP options message to the contact via a server (not shown), and to receive the reply message from the contact via the server, and controls RCS capability information of the contact to be updated based on the result of the capability discovery. The server may be a telecom service operator's server that provides data communication in addition to voice communication, and the RCS or RCS-e service.

An audio processor 325 may constitute a codec that includes a data codec and an audio codec. The data codec processes data, e.g., packet data, and the audio codec processes audio files, e.g., sound and multimedia files. The audio processor 325 may convert digital signals into analog signals and reproduce the analog signals with the audio codec, or may converting analog signals input through a microphone to digital audio signals with the audio codec, and transfer them to the modem. The audio codec may separately exist, or may be incorporated into a controller 310.

A key input unit 327 may include keys for entering alphanumeric information, function keys for establishing various functions, or a touch pad. If a display unit 350 is implemented with a touch display screen using capacitive sensing or pressure sensing, the key input unit 327 may include only a predetermined minimum number of keys and the display unit 350 may replace some key functions.

A memory 330 may include a program memory and a data memory, and the program memory stores a program to control general operations of the portable terminal. The memory 330 may further include an external memory, such as Compact Flash (CF), Secure Digital (SD), Micro Secure Digital (Micro-SD), Mini Secure Digital (Mini-SD), extreme Digital (xD), memory stick, and the like. The memory 330 may also include a disc, such as Hard Disc Drive (HDD), Solid State Disc (SSD), and the like.

In exemplary embodiments of the present invention, the memory 330 includes a phone book which may store information about contacts written by the user and a database (e.g., an RCS DB) which may store results of capability discovery for each of the contacts stored in the phone book. The RCS DB may be stored separately from the phone book or may be incorporated in the phone book.

A battery 340 supplies power to the portable terminal for operation and the controller 310 controls the operation of the portable terminal by adjusting and providing the power level for each component of the portable terminal. The controller 310 may be provided with information about e.g., the battery level (or the battery left), the battery temperature, and the like through a battery management unit (not shown).

The display unit 350 may be formed of a Liquid Crystal Display (LCD) or Organic Light Emitting Diodes (OLEDs), such as Passive Matrix Light Emitting Diodes (PMOLEDs) or Active Matrix Light Emitting Diodes (AMOLEDs), and outputs different display information generated by the portable terminal. The display unit 350 may operate as an input unit together with the key input unit 327 to control the portable terminal by including e.g., a capacitive or pressure sensitive touch screen.

In an exemplary embodiment of the present invention, the controller 310 controls the display unit 350 to display the RCS capability information of each of contacts stored in the phone book, which is updated according to the result of capability discovery for the contact. More particularly, the display unit 350 may display the RCS capability information of each contact in addition to common information about the contact (e.g., name and phone number). Here, the RCS capability information may be, e.g., information about whether an RCS service is available with the contact, or information about which RCS service is available.

The controller 310 may control general operations of the portable terminal, and may change and control operations of the portable terminal in response to a user input through the key input unit 327 or the display unit 350. In an exemplary embodiment of the present invention, with respect to performing the method of exchanging SIP options messages for RCS capability discovery in the portable terminal, the controller 310 may request a server for a setting value associated with an SIP options message exchange and receive the setting value including the number of the SIP options messages for transmission and a transmission cycle of the SIP options message. The controller 310 may transmit the SIP options message to each of as many contacts as the number of the SIP options messages for transmission in the transmission cycle, the contacts being registered to the phone book; may receive a reply message from the contact; and may update RCS capability information of the contact according to the received reply message. More detailed operations of the controller 310 according to exemplary embodiments will be described below.

It will be appreciated that other devices, such as Bluetooth modules, camera modules, GPS modules, Wi-Fi modules, proximity sensors, Digital Media Broadcasting (DMB) receivers, etc., not currently shown in the block diagram of FIG. 3A may be included in the portable terminal and provide respective functions.

Figure 3B:
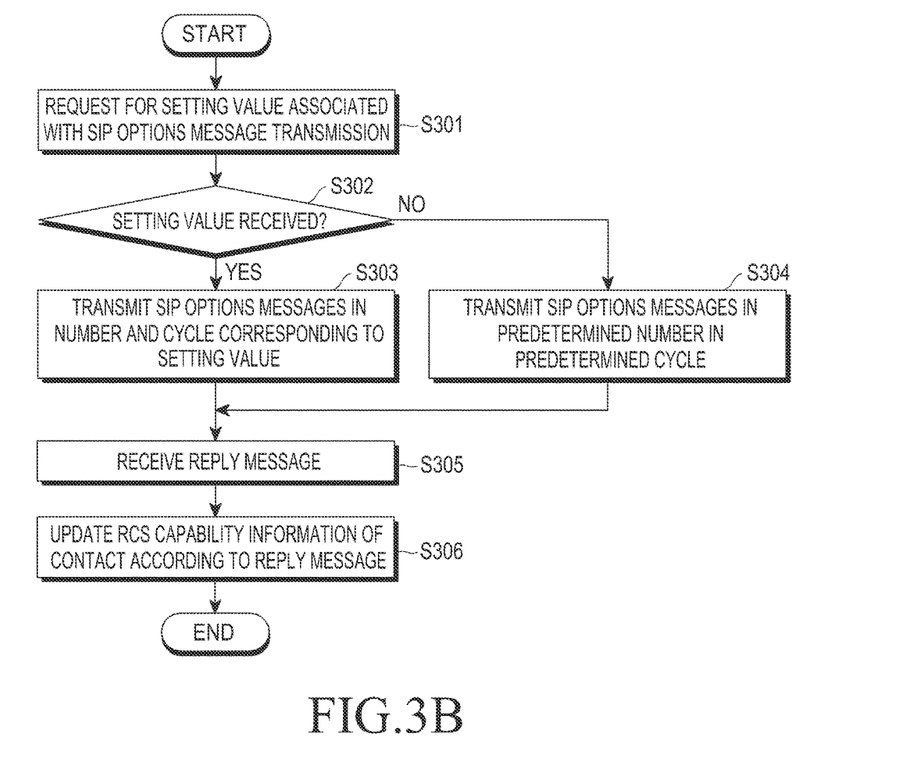
FIG. 3B is a flowchart illustrating a method of exchanging SIP options messages according to an exemplary embodiment of the present invention.

FIG. 3B is a flowchart illustrating a method of exchanging SIP options messages according to an exemplary embodiment of the present invention.

Referring to FIG. 3B, at steps S301 and S302, the controller 310 requests a server for a setting value associated with an SIP options message exchange and receives the setting value. At steps S303 and S304, upon reception of a setting value, the controller 310 transmits SIP options messages. More specifically, if a setting value is received, the controller transmits SIP options messages which correspond in number and cycle to the setting value at step 303. Otherwise, if no setting value is received, the controller 310 controls to transmit SIP options messages in predetermined number and predetermined cycles at step 304. At steps S305 and S306, the controller 310 receives reply messages from the portable terminals to which the SIP options messages were sent via the server, and controls the RCS capability information of respective contacts to be updated according to the received reply messages.

Figure 4A:
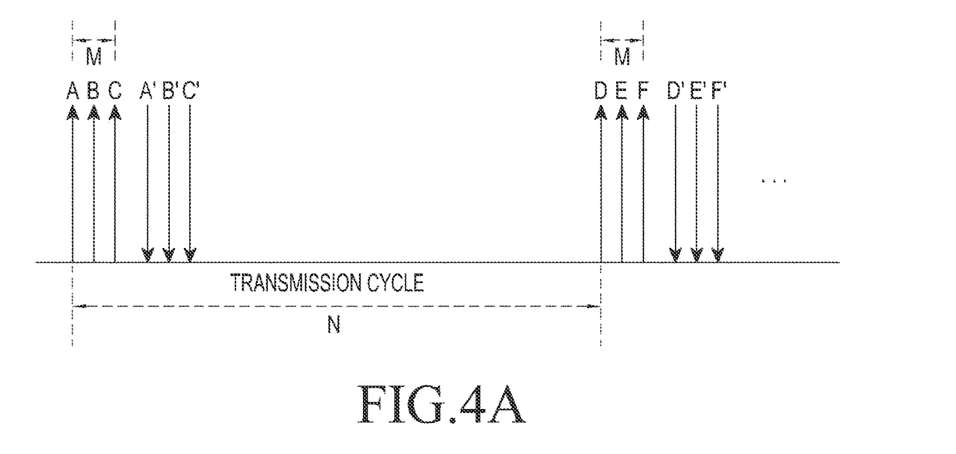
FIG. 4A illustrates a diagram of SIP options message exchanges according to an exemplary embodiment of the present invention.

FIG. 4A illustrates a diagram in terms of SIP options message exchanges according to an exemplary embodiment of the present invention.

Referring to FIG. 4A, M denotes the number of SIP options messages for transmission and N denotes an exchange (or transmission) cycle of the SIP options message. More specifically, if M is 3 and N is 15 seconds, the controller 310 consecutively transmits the SIP options messages A, B, and C to three contacts A, B, and C through a server (not shown), and obtains reply messages A', B', and C' from the contacts A, B, and C through the server. After the lapse of 15 seconds, the controller 310 starts exchanging the SIP options message with another three contacts D, E, and F by transmission of SIP options messages D, E, and F and reception of reply messages D', E', and F').

In an exemplary embodiment of the present invention, variable adjustment to values M and N based on a setting value associated with the transmission of the SIP options message may minimize battery consumption of the portable terminal caused by quite a number of SIP options message exchanges and avoid excessive generation of data traffic.

For instance, if the portable terminal stays in sleep mode for as much time as the rest of cycle N after consecutively exchanging SIP options messages with a number of contacts with significant increase in M (the number of SIP options messages for transmission) and N (transmission cycle) values, battery consumption may be reduced but data traffic for the server may increase at a particular point in time.

Figure 4B:
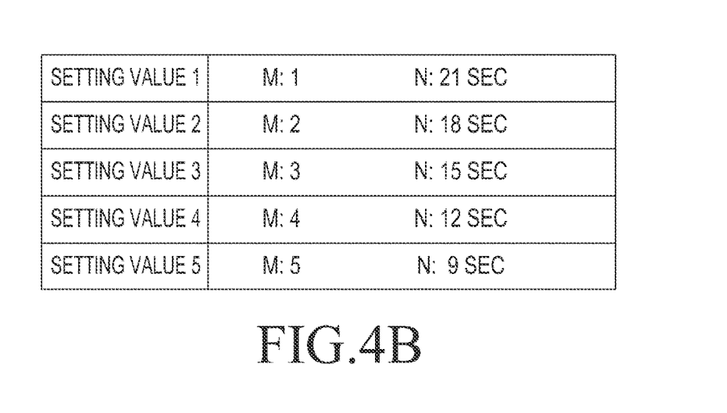
FIG. 4B illustrates examples of setting values of SIP options message exchanges according to an exemplary embodiment of the present invention.

Considering this, in exemplary embodiments of the present invention as shown in FIG. 4B, the controller 310 exchanges SIP option messages by variably applying the M and N values based on a received setting value associated with the SIP options message exchange.

FIG. 4B illustrates examples of setting values in terms of SIP options message exchanges, according to an exemplary embodiment of the present invention Referring to FIG. 4B, five levels of the setting value received from the server, i.e., setting values 1 to 5 are illustrated, with the setting value 1 having M=1 and N=21 seconds, the setting value 2 having M=2 and N=18 seconds, the setting value 3 having M=3 and N=15 seconds, the setting value 4 having M=4 and N=12 seconds, and the setting value 5 having M=5 and N=9 seconds.

Whereby, each M and N value in the setting values can be changed according to an exemplary embodiment of the present invention. For example, the setting value 1 having M=1 and N=9 seconds, the setting value 2 having M=2 and N=12 seconds, the setting value 3 having M=3 and N=15 seconds, the setting value 4 having M=4 and N=18 seconds, and the setting value 5 having M=5 and N=21 seconds can be used according to an exemplary embodiment of the present invention. Here, when M and N is increased together, more Sip options messages (i.e. increased M) can be exchanged in a long term period (i.e. increased N), thereafter the consumption of the battery can be reduced.

With the setting value 1, an SIP options message is exchanged with a single contact in a cycle of 21 seconds, and with the setting value 5, SIP options messages are exchanged with 5 contacts at 9-second intervals.

In the exemplary embodiment described above, the setting value is received from the server, which is a telecom service operator's server that provides data communication in addition to voice communication, and the RCS or RCS-e service. It is thus assumed that any of the setting values (e.g., setting values 1 to 5) is transmitted to the portable terminal by the server variably establishing values M and N based on the network condition.

At steps S303 and S304, upon reception of a setting value, the controller 310 transmits as many SIP options messages as defined in the setting value at intervals defined in the setting value, and otherwise, if no setting value is received, the controller 310 controls the SIP options messages in predetermined number to be transmitted in predetermined cycles.

As described above, the server may transmit such a setting value as shown in FIG. 4B.

Figure 4C:
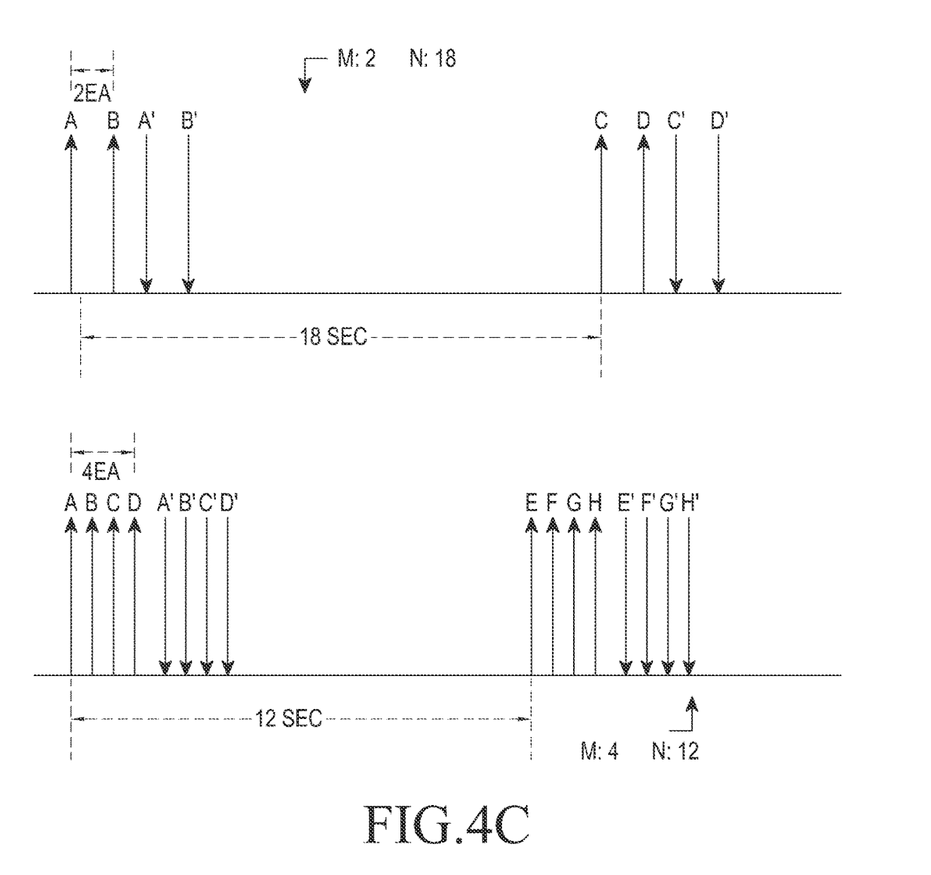
FIG. 4C illustrates diagrams of SIP options message exchanges according to an exemplary embodiment of the present invention.

FIG. 4C illustrates diagrams of SIP options message exchanges according to an exemplary embodiment of the present invention.

Referring to FIG. 4C, if the setting value received from the server corresponds to the setting value 2, the controller 310 controls SIP options messages A and B to be transmitted to two contacts, and after the lapse of 18 seconds, controls SIP options messages C and D to be transmitted to another two contacts, as shown in FIG. 4C.

As another example, if the setting value received from the server corresponds to the setting value 4, the controller 310 controls SIP options messages A to D to be transmitted to four contacts A to D, and after the lapse of 12 seconds, controls SIP options messages E to H to be transmitted to another four contacts E to H, as shown in FIG. 4C. Reply messages are shown as A' to H'.

If any setting value, as shown in FIG. 4B, is not received or fails to be received within a predetermined time, due to a network condition of the server, the controller 310 may transmit the SIP options messages based on predetermined values M and N (e.g., M=3 and N=15 seconds).

In the exemplary embodiment described above, the SIP options message is transmitted based on values M and N of the setting value received from the server, but in another exemplary embodiment, values M and N may be modified by reflecting the battery level.

For example, if the setting value 3 is received from the server and the battery level is higher than a predetermined threshold, the controller 310 changes M=3 and N=15 seconds to M=4 and N=12 seconds so that more SIP options messages may be transmitted for a short period of time. On the contrary, if the setting value 3 is received from the server and the battery level is lower than the predetermined threshold, the controller 310 changes M=3 and N=15 seconds to M=2 and N=18 seconds, to reduce the number of SIP options messages to the minimum for a predetermined period of time.

At steps S305 and S306, the controller 310 receives reply messages from the portable terminals to which the SIP options messages were sent via the server, and controls the RCS capability information of respective contacts to be updated according to the received reply messages.

After transmission of the SIP options messages at steps S303 and S304 and reception of the reply messages at steps S305, the controller 310 may examine the reply messages to determine the result of capability discovery for each contact and store the results in the database (e.g., the RCS DB).

In an exemplary embodiment as illustrated in FIG. 4C, the controller 310 may transmit SIP options messages A and B to the portable terminals of the contacts A and B and in return receives reply messages A' and B'. In another exemplary embodiment, the controller 310 may transmit SIP options messages E to H to the portable terminals of the contacts E to H and in return receives reply messages E' to H'. Among various possible types of the reply message, 200 OK or 404 NOT FOUND is assumed to be received as the reply message.

Figure 4D:
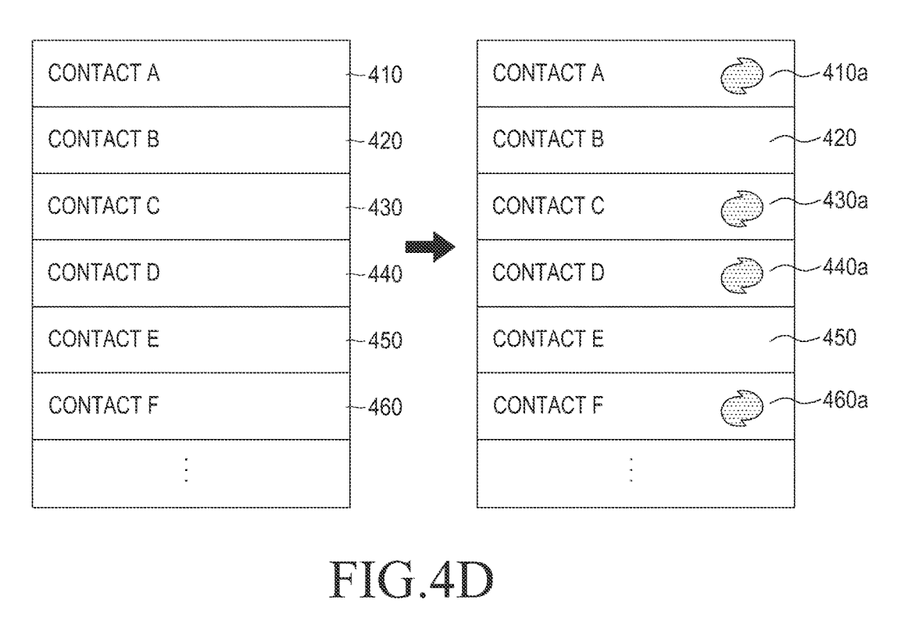
FIG. 4D illustrates changes in setting values of SIP options message exchanges according to an exemplary embodiment of the present invention.

FIG. 4D illustrates changes in setting values of SIP options message exchanges according to an exemplary embodiment of the present invention.

Referring to FIG. 4D, the controller 310 controls the RCS (or RCS-e) capability information of a contact to be updated according to the received reply message.

Having determined that the reply message received from the portable terminal of contact A via the server is 200 OK, the controller 310 updates the RCS (or RCS-e) capability information e.g., from 410 to 410a, to visually notify the user that the RCS service is available with contact A. Similarly, having determined that the reply messages received from portable terminals of contacts C, D, and F are 200 OK, the controller 310 updates the RCS (or RCS-e) capability information e.g., from 430, 440, and 460 to 430a, 440a, and 460a, respectively, to visually notify the user that RCS services are available with contacts C, D, and F, respectively.

Upon reception of the 200 OK reply message, the controller 310 may check the tag information as shown in FIG. 1b included in the 200 OK reply message and display a contact that sent the 200 OK reply message (e.g., contact A of FIG. 4D) with a type of the available RCS service.

On the contrary, upon reception of the 404 NOT FOUND reply messages from contacts B and E, the controller 310 may notify the user that RCS services are not available with contacts B and E by not displaying any icons that correspond to the RCS services in association with the contacts B and E.

In the above exemplary embodiments, after the SIP options message exchange, the portable terminal may enter the sleep mode for the rest of the cycle N, thus minimizing the battery consumption. In other words, the longer the value N is, the longer the portable terminal stays in the sleep mode, which reduces the battery consumption of the portable terminal.

More particularly, if the setting value received from the server is setting value 4, the controller 310 transmits SIP options messages to respective four contacts, receives respective reply messages in return, and enters the sleep mode until next transmission of the SIP option message.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention. Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of exchanging session initiation protocol (SIP) options messages for rich communication suite (RCS) capability discovery in a portable terminal, the method comprising:
   requesting a setting value from a server, wherein the setting value is associated with a SIP options message exchange and corresponds to data traffic for the server;
   receiving the setting value including a transmission period of the SIP options messages and a number of the SIP options messages for transmission in the transmission period;
   transmitting a SIP options message to each of first contacts among a plurality of contacts sequentially, wherein the first contacts are as many contacts as the number of the SIP options messages for transmission in a first time period of the transmission period based on the setting value;
   receiving a response message from each of the first contacts to which the SIP options message is transmitted in a second time period of the transmission period, sequentially; and
   updating RCS capability information of each of the first contacts according to the response message,
   wherein the plurality of contacts is registered to a memory of the portable terminal,
   wherein the second time period follows the first time period, and
   wherein, when the first contacts include a first device and a second device, the portable terminal transmits the SIP options message to each of the first device and the second device sequentially in the first time period and receives the response message from each of the first device and the second device sequentially in the second time period.

2. The method of claim 1, further comprising:
   if the setting value is not received, transmitting the SIP options message to each of a predetermined number of contacts registered to the memory in a predetermined period.

3. The method of claim 1, wherein the number of the SIP options messages for transmission and the transmission period of the SIP options message are changed based on a network condition of the server.

4. The method of claim 1, further comprising:
   entering a sleep mode after the second time period of the transmission period.

5. The method of claim 1, further comprising:
   checking a battery level;
   changing the number of the SIP options messages for transmission and the transmission period of the SIP options message based on the battery level;
   transmitting the SIP options message to each of as many contacts as the changed number of the SIP options messages in the changed transmission period; and receiving the response message from each of the contacts to which the SIP options message is transmitted.

6. The method of claim 5, wherein the changing of the number of the SIP options messages comprises:
increasing the number of the SIP options messages for transmission, and
decreasing the transmission period, based on the battery level being higher than a predetermined threshold.

7. The method of claim 5, wherein the changing of the number of the SIP options messages comprises:
decreasing the number of the SIP options messages for transmission, and
increasing the transmission period, based on battery level being lower than a predetermined threshold.

8. An apparatus for exchanging session initiation protocol (SIP) options messages for rich communication suite (RCS) capability discovery in a portable terminal, the apparatus comprising:
a wireless transceiver;
a memory; and
at least one processor configured to:
request, via the wireless transceiver, a setting value from a server, wherein the setting value is associated with a SIP options message exchange and corresponds to data traffic of the server,
receive, via the wireless transceiver, the setting value including a transmission period of the SIP portions messages and a number of the SIP options messages for transmission in a transmission period,
transmit, via the wireless transceiver, the SIP options message to each of first contacts among a plurality of contacts in the transmission period, sequentially, wherein the first contacts are as many contacts as the number of the SIP options messages in a first time period of the transmission period based on the setting value,
receive, via the wireless transceiver, a response message from each of the first contacts to which the SIP options message is transmitted in a second time period of the transmission period, sequentially, the plurality of contacts being registered to the memory of the portable terminal, and
update RCS capability information of each of the first contacts according to the response message,
wherein the second time period follows the first time period, and
wherein, when the first contacts include a first device and a second device, the at least one processor is further configured to:
transmit, via the wireless transceiver, the SIP options message to each of the first device and the second device sequentially in the first time period, and
receive, via the wireless transceiver, the response message from each of the first device and the second device sequentially in the second time period.

9. The apparatus of claim 8, wherein, if the setting value is not received, the at least one processor is further configured to transmit, via the wireless transceiver, the SIP options message to each of a predetermined number of contacts registered to the memory in a predetermined period.

10. The apparatus of claim 8, wherein the number of the SIP options messages for transmission and the transmission period of the SIP options messages are changed based on a network condition of the server.

11. The apparatus of claim 8, wherein the at least one processor is further configured to control the portable terminal to enter a sleep mode after the second time period of the transmission period.

12. The apparatus of claim 8, wherein the at least one processor is further configured to:
check a battery level and changes the number of the SIP options messages for transmission and the transmission period of the SIP options message based on the battery level;
transmit, via the wireless transceiver, the SIP options message to each of as many contacts as the changed number of the SIP options messages in the changed transmission period; and
control a response message from each of the contacts to which the SIP options message is transmitted.

13. The apparatus of claim 12, wherein the at least one processor is further configured to:
increase the number of the SIP options messages for transmission, and
decrease the transmission period, based on the battery level being higher than a predetermined threshold.

14. The apparatus of claim 12, wherein the at least one processor is further configured to:
decrease the number of the SIP options messages for transmission, and
increase the transmission period, based on the battery level being lower than a predetermined threshold.

15. A non-transitory computer-readable storage medium storing instructions that, when executed, cause at least one processor to perform the method of claim 1.

* * * * *